Figure 1:
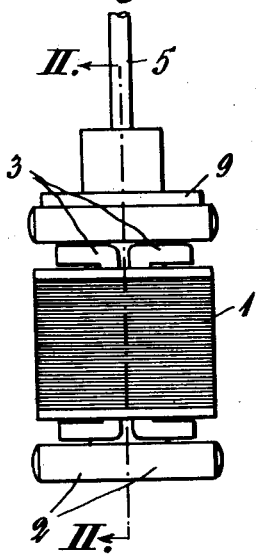

Aug. 28, 1951 — K. B. PALME — 2,565,781
DEVICE FOR THE REMOTE TRANSMISSION OF ROTARY MOVEMENTS WITH CORRECT ANGULAR DISPLACEMENT
Filed Feb. 26, 1948

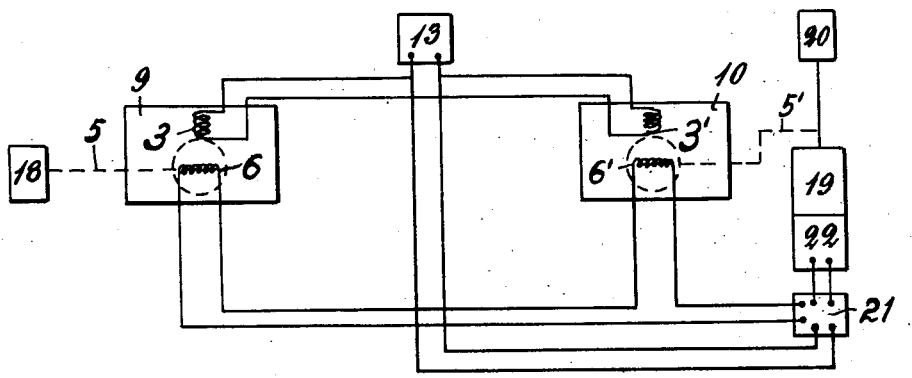
Fig. 5.
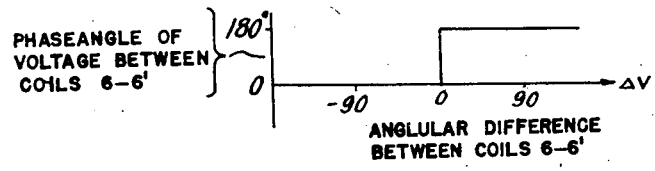
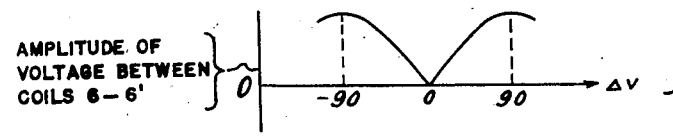
Fig. 6.
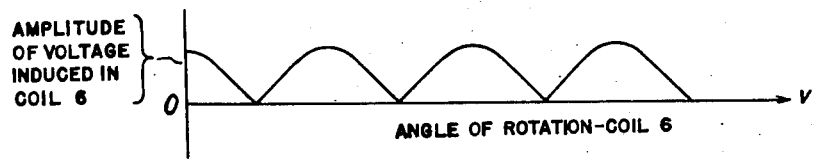
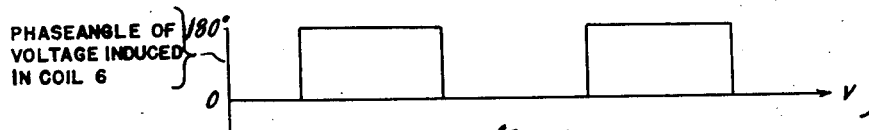
Fig. 7.
Fig. 8.
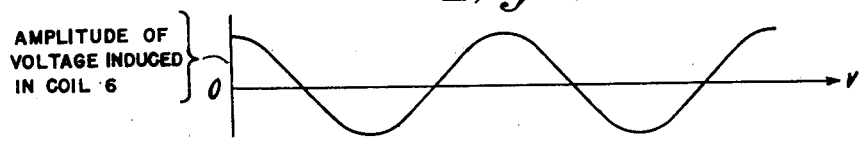

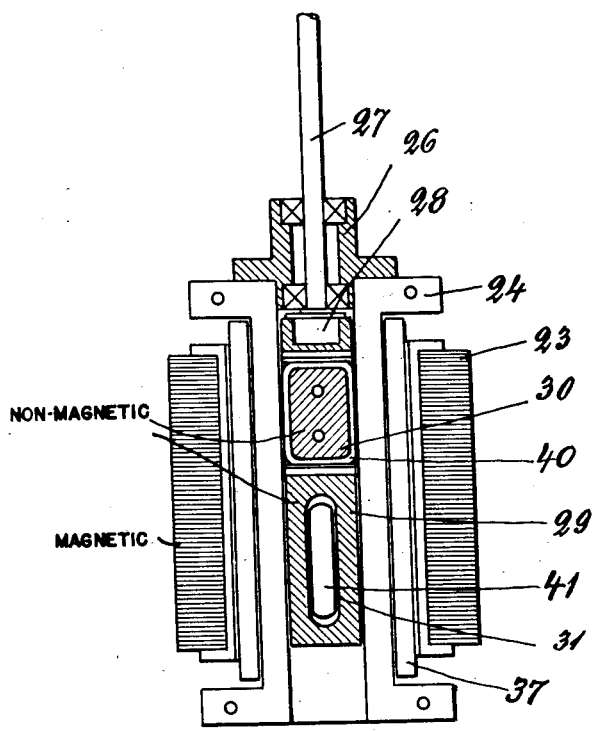

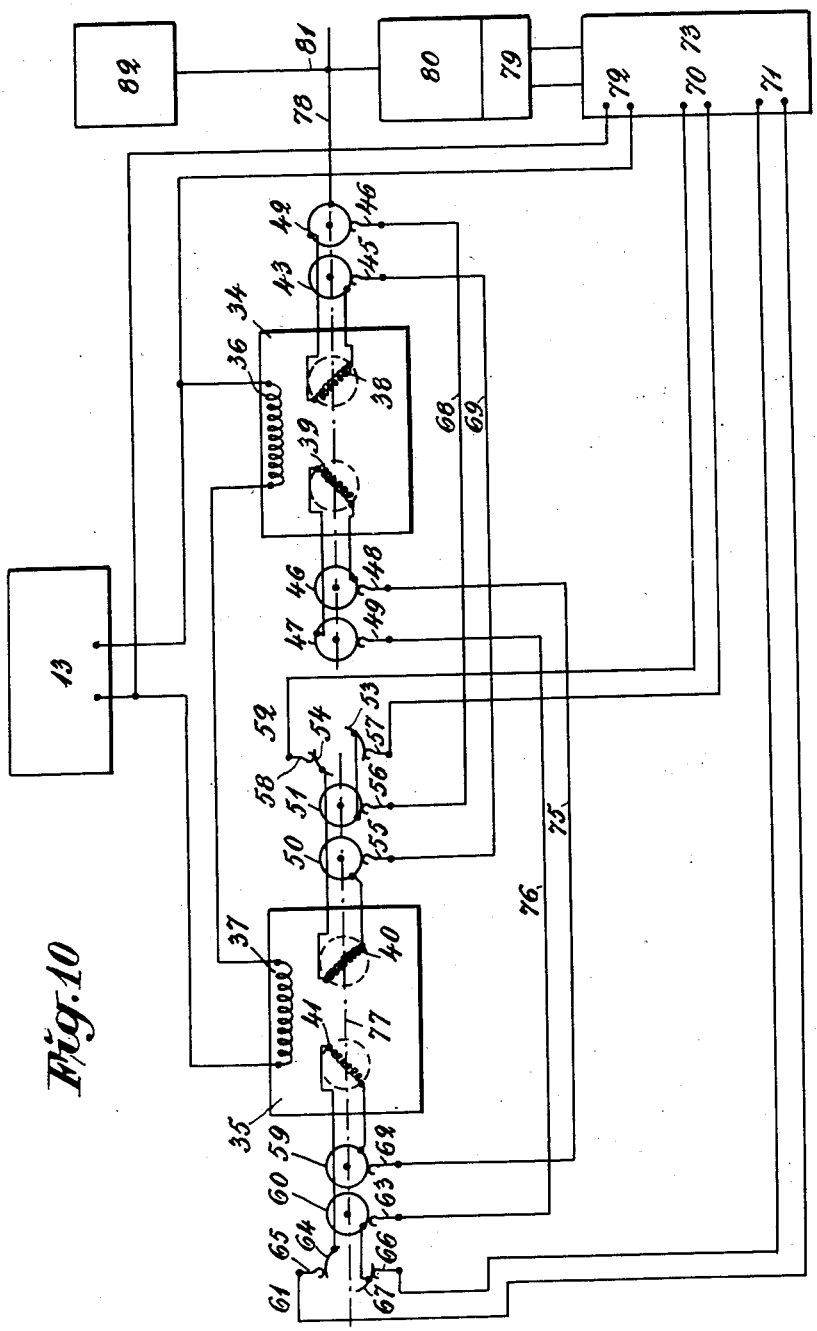

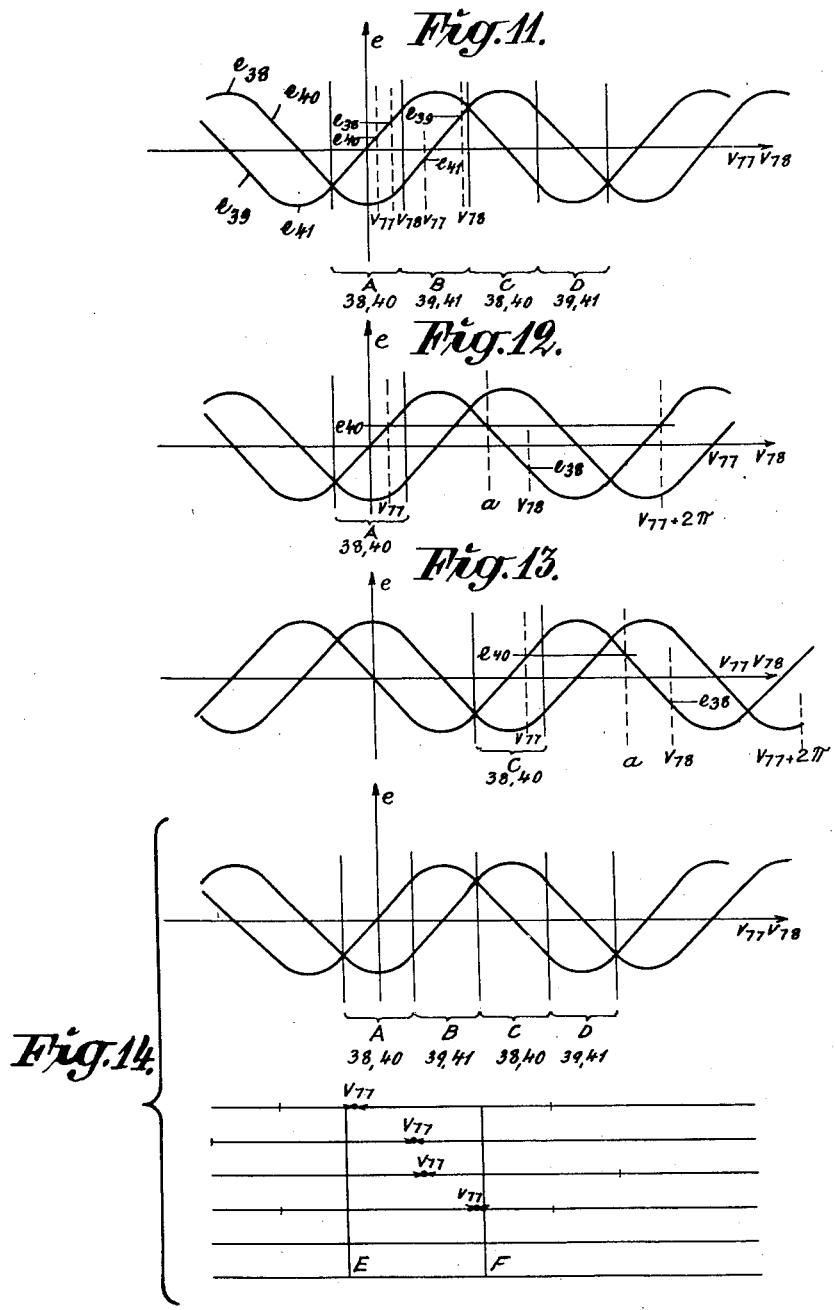

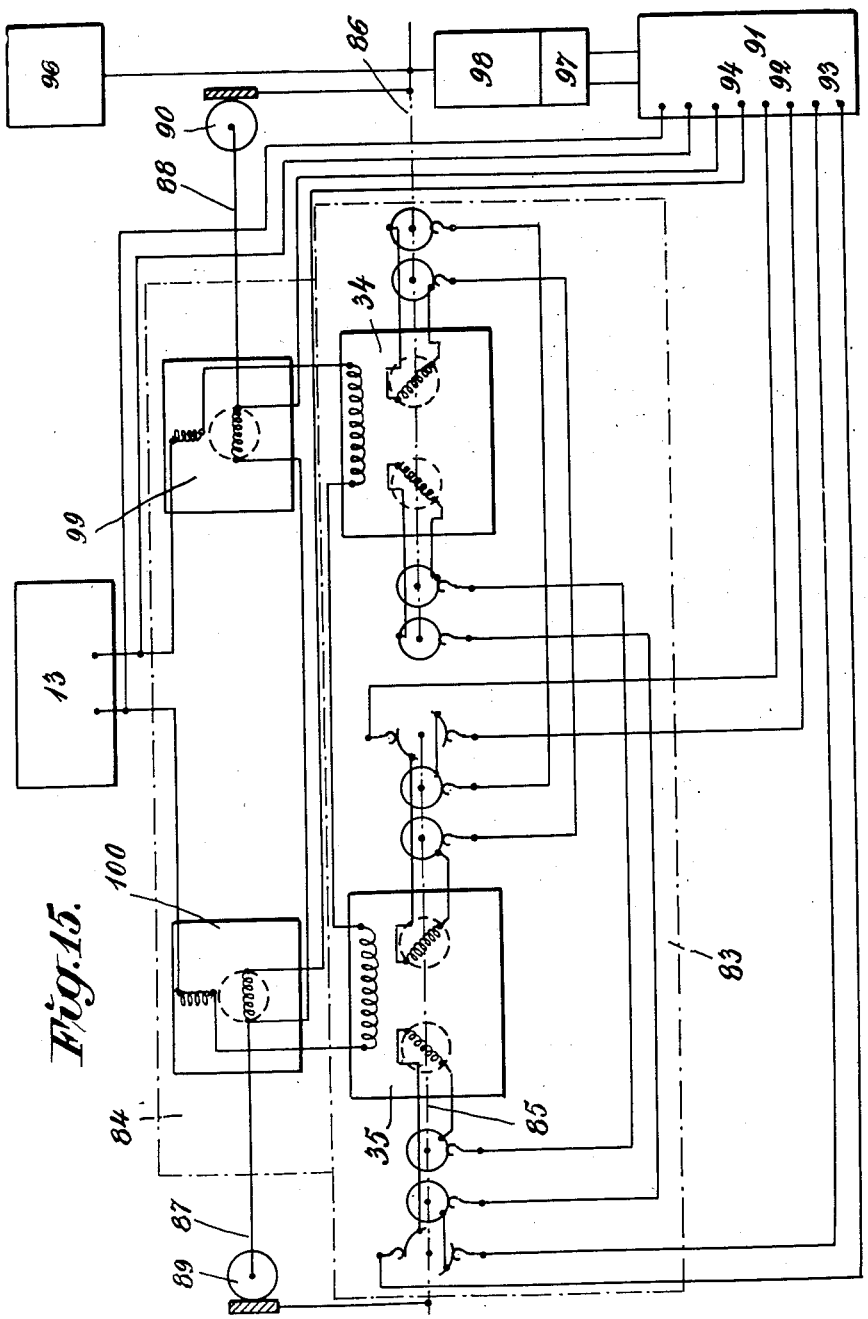

UNITED STATES PATENT OFFICE 2,565,781

DEVICE FOR THE REMOTE TRANSMISSION OF ROTARY MOVEMENTS WITH CORRECT ANGULAR DISPLACEMENT

Karl Bertil Palme, Stockholm, Sweden, assignor to Aktiebolaget Bofors, Bofors, Sweden, a corporation of Sweden Application February 26, 1948, Serial No. 11,256 In Sweden May 19, 1945

Section 1, Public Law 690, August 8, 1946 Patent expires May 19, 1965

3 Claims. (Cl. 318—28)

In devices for the automatic adjustment of objects in positions which are predetermined by a remote controlling shaft the angle of rotation of which, from a given initial position, represents the position in which the controlled object is to be set, an apparatus is required for comparing the angular positions of the last-mentioned shaft and a shaft coupled to the object to be controlled, the angular position of which latter shaft represents the position of adjustment of the controlled object. For making angular comparisons of this kind a number of different electrical systems are already known, such as the three-phase or single-phase synchro (self-synchronising) system. In a known synchro system of this kind the transmitter and receiver are exactly similar and each consists of a stator with a single-phase winding and a rotor with a three-phase winding. Of these windings, the single-phase stator windings are supplied from one and the same network, so that the alternating magnetic fields generated in these windings are in phase with one another. The rotor windings are connected together through sliprings in such a way that with the same angular positions of the rotors, the voltages induced in the rotor windings oppose one another so that no currents flow in these rotor windings. When the angular positions are not in conformity, currents are set up which exert a rotary torque on the rotors which tends to bring the said rotors into positions in conformity with one another. This system, however, has the draw-back of the transmitter shaft being influenced by a torque which is at least as great as that required for rotating the receiver, and it must therefore be designed accordingly. Furthermore, the employment of a three-phase system naturally introduces some complications. It is also known to use synchros where the stator and rotor windings both are single-phase windings. In such cases, where a very accurate comparison of the angles is required, the hitherto known systems entail complicated arrangements which, as mentioned above, are also accompanied by an undesirably heavy loading of the controlling device.

The present invention relates to a device for the remote control of rotary movements with correct angular displacement from a controlling shaft to a controlled shaft by means of single-phase synchro systems, characterized by that, of the two parts of the synchro, which can rotate in relation to one another, the outer part preferably forming the stator of the synchro element and having a winding with a core of magnetic material, is designed in such a way that the alternating field set up between its poles is homogeneous for the greater part at least, whilst the winding for the other inner part preferably forming the rotor is provided with a core of nonmagnetic material.

Thus, it is characteristic of a device according to the invention that it includes members, the different synchros, which produce an alternating voltage the amplitude of which is very accurately proportional to some function of the member's angle of rotation common to all members, such as the sine of the said angle calculated from the angular position in which the alternating voltage set up has zero amplitude. In one embodiment of the invention the angular comparison is effected by comparing the voltages produced by the synchro elements. An arrangement of this kind can be employed in its simplest form for automatic remote control in cases where the whole range of adjustment for the controlled device may be represented by an angular adjustment range of less than 180° in the said synchro elements. In cases where this is not possible, as for example where the controlled object's adjusting movement comprises rotation that may include an unlimited number of revolutions, which may apply for instance to the azimuth movement of a gun turret, other embodiments of the invention may be employed which will be described later.

Figure 2:
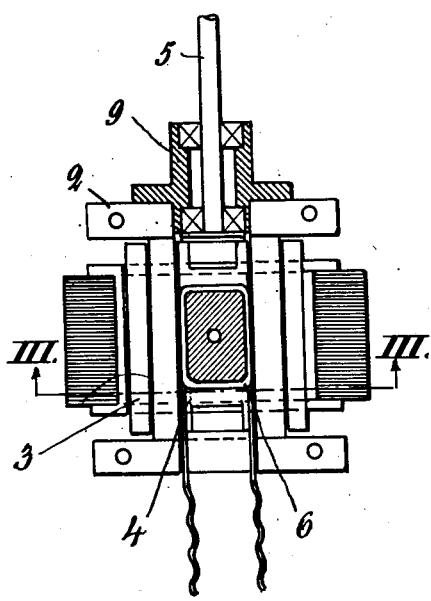
Figure 4:
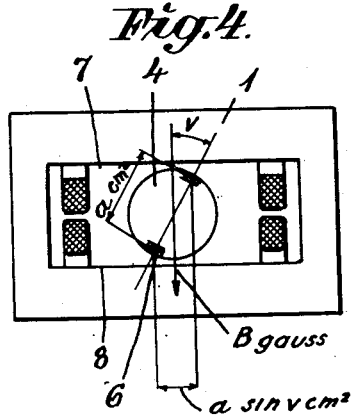
Figure 3:
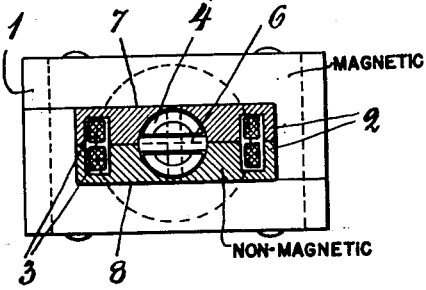

For the clearer understanding of the invention the forms of construction referred to above will now be described with reference to the accompanying drawings Figs. 1–15. Of the said drawings Fig. 1 is a plan, Fig. 2 is a section along the line II—II of Fig. 1 and Fig. 3 is a section on the line III—III of Fig. 2 of a synchro element for producing an alternating voltage, which is constructed in such a way that the dependence, determined by the type of element, of the alternating voltage's amplitude on an angle of rotation to which the element is adjusted can be reproduced with great accuracy in a number of such synchro elements constructed in the same manner. Fig. 4 shows a cross-section through the synchro element. This figure is employed for determining the relation between the angle of rotation of the synchro's rotary system and the amplitude of the alternating output voltage of the synchro. Fig. 5 shows the connection of the synchros for angular comparison in automatic remote control. Fig. 6 shows the values obtained from angular comparisons, as functions of the difference between the adjustment angles of the controlling and controlled shafts. Fig. 7 shows the amplitude and phase angle of the voltage induced in the rotor portion of a synchro element according to Fig. 1, as a function of the rotor's angle of rotation. Fig. 8 shows the same voltage amplitude transformed to the phase-angle zero. Fig. 9 shows a combination of two synchros intended for remote control of an adjusting movement which requires a greater range of angular adjustment than can be achieved by a pair of plain synchros. Fig. 10 is a diagram of connections for employing the combined synchro elements according to Fig. 9. Figs. 11–14 show different diagrams for elucidating the method of operation of the device according to Fig. 10. Fig. 15 is a diagram of connections for a device according to Fig. 10, supplemented by a so-called coarse system by means of which the range of adjustment for a single adjusting movement can be further multiplied.

In Fig. 1, 1 is a stator constructed of laminated plates, 2 are two holders of non-magnetic material fixed in the stator, which carry the coils 3. The latter lie in slots cut in the coil-holders 2 in such a way that the coils 3 retain a well-defined and permanent shape. The coil-holder 4 is likewise constructed of non-magnetic material and carries the coil 6 which is wound in layers with a predetermined number of turns. The coil-holder 4 and the coil 6 are constructed with very accurate dimensions. They are mounted on the shaft 5 which is rotatably supported in the bearing bracket 9 fixed to the coil-holders 2.

An alternating current is supplied to the winding 3 so that an alternating magnetic field is set up in the device. An alternating voltage is thus induced in the windings 6, the amplitude and phase angle of which voltage are functions of the angle of rotation $v$ of the system 4, 5 and 6, as indicated in Fig. 4. The amplitude of the induced voltage at a given value of $v$ is determined by the dimensions of the device in Fig. 1 and the current supplied to the winding 3. Since, owing to the form of construction chosen, the geometrical dimensions can be reproduced with great accuracy in different individuals of the device, provided that the same current is supplied to their windings 3 by connecting the windings 3 in series for example, these separate individuals will have voltages induced in the windings 6 the amplitudes of which will only differ from one another by an extremely small amount when the values for the angle of rotation $v$ are in conformity with each other.

In the device shown in Fig. 1 the pole surfaces 7 and 8 have been so extended in sidewise direction in relation to the distance between them that the field surrounding the coil 6 is substantially homogeneous. Small parallel displacements of the shaft 5 will not then cause any change in the magnitude of the voltage induced in the coil 6 for any value of $v$. The demand for accuracy in the centering of the shaft 5 is hereby reduced, which is of importance particularly when it is desired to construct the device with small dimensions.

Let the surface surrounded by one turn of the coil 6 be $a$ cm.² According to Fig. 4 this surface forms the angle $v$ in the direction of the field between the pole surfaces 7 and 8. If the induction of the field is B gauss, the magnitude of the voltage induced in the winding turn will be $$e = \frac{dB}{dt} \cdot a . \sin v . 10^{-8} \text{ volts}$$

If a sine-wave alternating current is supplied to the winding 3 which acts as a magnetising winding, the induction B will vary in sine form with the time:

$$B = B_m . \sin \omega t$$

where $\omega$ = the angular frequency of the magnetising current. In this case $$e = \omega . B_m . a . \sin v . \cos \omega t . 10^{-8} \text{ volts}$$

For the whole coil 6, if its number of winding turns is N and the average value of the surfaces surrounded by the winding turns is $a_{av}$:

$$e = N . \omega . B_m . a_{av} . \sin v . \cos \omega t . 10^{-8} \text{ volts}$$

In Fig. 5 the connection is shown in principle for a remote control device constructed with the synchro element shown in Fig. 1. The synchro elements 9 and 10 are each constructed in the form shown in Fig. 1. The windings 3 and 3' each correspond in structure to the winding 3 in Fig. 1. These windings 3 and 3' are connected in series and current is supplied to them from the generator 13 which may be an audio frequency generator. The windings 6 and 6' each correspond to the winding 6 in Fig. 1 and the adjustment of their rotation is effected by means of the shafts 5 and 5' respectively. The shaft 5 is rotated by the controlling member 18 the adjustment of which is to be transmitted to the object 20 adjusted by the motor 19. The shaft 5' is coupled to the adjusting movement for the object 20. The coils 6 and 6' are connected to one another in series and to the input circuit of an amplifier 21. The coils 6 and 6' are hereby connected in such a way that the voltages induced in them counteract one another when the coils are in the same position. Thus, when any angular difference exists between the positions of the coils 6 and 6' a difference of potential corresponding to this angular difference is applied to the amplifier 21, the amplitude and phase position of which vary with the angular difference as shown in Fig. 6. The amplifier 21 now influences the starting device 22 for the motor 19 in some manner known per se, so that the latter rotates the shaft 5' and therefore the coil 6' to the position in which the said potential difference is reduced to zero. To simplify illustration of the follow-up system incorporating the present invention, amplifier 21, the starting device 22 and motor 19 have been shown in block schematic only since various types can be used and the details of this group of components are not only well known but also are not essential insofar as this invention is concerned. One general type that can be used is described in U. S. Patent No. 1,973,279 issued to H. L. Bernarde, September 11, 1934. In view of the above-mentioned accuracy with which the voltages induced in the rotatable coils 6 and 6' each correspond to the value of the angle of rotation for the respective rotatable system (corresponding to the system 4, 5 and 6 in Fig. 1) in the synchro elements 9 and 10, conformity between the induced voltages in the coils 6 and 6' will find its counterpart in the fact that the angles of rotation for the shafts 5 and 5' will correspond to one another very closely and that the object 20 will also be adjusted in its predetermined position with great accuracy by the controlling member 18. In tests carried out with a device as described above it was found that deviations between the position predetermined for the object 20 by the controlling member 18 and the position in which the object 20 was actually adjusted were less than 0.001 radian calculated at the angular adjustment of the shaft 5'. If the whole range of adjustment for the object 20 is now represented by an angular range of 90° at the shaft 5', the adjustment error for the object 20 will be less than 1/1570 of the entire range of adjustment. The device may therefore be said to operate with an adjustment range comprising 1570 accurate steps.

The amplitude and phase angle of the voltage produced by a synchro element as shown in Fig. 1 are illustrated in Fig. 7 as functions of the angle of rotation for the rotating system. The reasoning I wish to put forward hereinafter will be simplified however, if it is borne in mind that a voltage having a certain positive amplitude and a phase angle equal to 180° may be replaced by an alternating voltage with a phase angle equal to zero and a negative amplitude. If this substitution is carried through, the voltage produced will have a phase angle which is wholly independent of the angle of rotation in the rotatable system and an amplitude which is dependent upon the said angle of rotation in the manner shown in Fig. 8. It will be seen from the figure that for certain values of the angle of rotation, such as $$\frac{\pi}{2} \text{ and } -\frac{\pi}{2}$$

the amplitude of the voltage is independent of the angle of rotation within a small range. Within this range it is obviously impossible to obtain an accurate angular adjustment by comparing the voltage produced with a given voltage. Consequently the range of angular adjustment must lie within the limits $$-\frac{\pi}{2} < v < +\frac{\pi}{2}$$

In order to obtain an accurate angular adjustment it is necessary for the voltage produced to change to an appreciable extent with a change in the angle of adjustment. The serviceable range of angular adjustment will thus lie approximately between the limits $$-\frac{\pi}{4} \text{ and } +\frac{\pi}{4}$$

A further circumstance that also necessarily limits the range of angular adjustment is that with an unlimited range of angular adjustment it is not possible to obtain a single valued adjustment of the controlled object, and within certain portions of the range it would not be possible either to cause the controlled device to move into the predetermined position.

A form of construction for the invention is shown in Figs. 9 and 10 which can be employed for transmissions in which the range for single valued angular adjustment may be twice as great as in the device described above, and also for transmissions in which the angular adjustment may include an unlimited number of revolutions and remain correct to within a very small fraction of a revolution.

Fig. 9 shows a section through a device comprising a combination of two synchros. 23 is a stator constructed of laminated plates in which two coil-holders 24 are fixed (only one of them is shown in the figure). These carry a magnetising winding 25 consisting of two coils. To the coil-holders 24 the bearing bracket 26 is fixed in which the shaft 27 is supported. The latter has a holder 28 attached at one end which supports a shaft 29 of non-magnetic and insulating material. In this shaft two slots are milled which pass right through the shaft and the planes of which are at right-angles to one another. In these slots the coil-holders 30 and 31 are located which carry the coils 40 and 41. These coils are wound with very accurately determined dimensions. Their winding planes are at right-angles to one another. In the case where the range of angular adjustment is to include a number of revolutions, this arrangement may be supplemented by a slip-ring device attached to the shaft 27, which is not shown in the figure. The connecting leads to the sliprings from the coils 40 and 41 are then passed through a bore in the shaft 27, which is likewise not shown in the figure.

Fig. 10 is a diagram of the connections for the remote control device. The members 34 and 35 are each constructed in accordance with Fig. 9. The windings 36 and 37 correspond to the magnetising winding 37, and the windings 38 and 40 correspond to the winding 40, 39 and 41 corresponding to the winding 41. As the figure shows, the coil 38 is connected to slip-rings 42, 43 on which sliding brushes 44 and 45 lie. Similarly, the coil 39 is connected to the slip-rings 46, 47 with the sliding brushes 48, 49. The coil 40 is connected to the slip-ring 50 against which the sliding brush 55 lies, and to the segment 54 in the commutator 52. The coil 41 is connected to the slip-ring 59 with the sliding brush 62, and to the segment 64 in the commutator 61. Further, the segment 53 in the commutator 52 is connected to the slip-ring 51 against which the sliding brush 56 lies. By means of the conductors 68 and 69 the sliding brushes 44 and 45 are connected to the brushes 56 and 55 respectively. By means of the members 43, 51, 56, 68, 44 and 42 and the members 43, 45, 69, 55 and 50 the coils 38 and 40 are therefore connected in series between the sliding brushes 57 and 58. Through the latter the difference in the voltage induced in the coil 38 and the coil 40 is led to the input terminals 70 of the amplifier 73. The segments 53 and 54 on the commutator 52 are so shaped that the coils 38 and 40 are only connected to the amplifier 73 when the coil 40 comes within the angular range +45° from the two positions in which the voltage induced in the coil 40 is zero. In an analogous manner the coils 39 and 41 are connected to the input terminals 71 of the amplifier 73 by means of the members 46, 48, 75, 62, 59, 64, 65, 66, 67, 60, 63, 76, 49 and 47. The segments 64 and 74 on the commutator 61 establish contact with the brushes 61 and 66 through the angular range ±45° from the positions in which the voltage induced in the coil 41 is zero. Since the winding planes of the coils 40 and 41 form an angle of 90° with one another, the segments 64 and 67 in the commutator 61 will also be displaced 90° in the direction of rotation to the segments 53 and 54 in the commutator 52. This will result in the pairs of coils 38, 40 and 39, 41 being connected to the amplifier 73 alternatively. All the segments cover a somewhat greater angular range than 90°. In this way a slight overlap is obtained between the connection ranges for the pairs of coils 38, 40 and 39, 41 so that at the transition points between the connection ranges for the pairs of coils both pairs are connected up simultaneously. As in the case of the previously described system shown in Fig. 5, none of the details of construction of the follow up components comprising amplifier 73, motor 80 and its starter 79 have been illustrated in Fig. 10 since they are of no particular significance per se, and the arrangement can be as described in the previously mentioned Bernarde patent.

The method of operation of the above device is described here with reference to Fig. 11 which shows curves for the amplitudes of the voltages induced in the coils 38, 39, 40 and 41 as functions of the angles of rotation for the shafts 77 and 78 in Fig. 10, whereby the angles are measured from the positions in which the voltages induced in the coils 38 and 40 are zero. The curves have been plotted in the same manner as in Fig. 8, that is to say, the phase angles for the voltages are understood to be constant whilst the amplitudes assume both positive and negative values. The connection ranges for the pairs of coils 38, 40 and 39, 41 are shown to be limited by vertical lines. The designation $v_{77}$ indicates the angle of rotation for the shaft 77 and $v_{78}$ is the angle of rotation for the shaft 78. For the description of the method of operation of the device with small differences between the angles $v_{77}$ and $v_{78}$ four cases A, B, C, D are shown in the figure with the angles $v_{77}$ and $v_{78}$ inserted at small angular distances from each other. The cases are distributed in such a way that one case is obtained in each of four consecutive connection ranges for the pairs of coils 38, 40 and 39, 41. In every case $v_{78}$ is greater than $v_{77}$.

In case A the potential difference $e_{38}-e_{40}$ is positive. $v_{77}$ represents the angular position into which the shaft 78 is to be moved. The potential difference $e_{38}-e_{40}$ is applied to the amplifier 73 in the manner described above. The latter influences the starter 79 for the motor 80 in some manner known per se, and in such a direction that the motor 80 starts and turns the shaft 81 and consequently the shaft 78 coupled to it, in the direction towards the prescribed position. $v_{78}$ is therefore changed in a direction towards $v_{77}$. When $v_{78}$ is equal to $v_{77}$, according to Fig. 11 the potential difference $e_{38}-e_{40}$ is equal to zero. The starter 79 is then returned to its zero position and the motor 80 stops. The amplifier 73, the starter 79, the motor 80 and the shafts 81, 78 are therefore so coupled together that a positive value for the potential difference $e_{38}-e_{40}$ will result in a reduction of $v_{78}$. In case B is a positive value for the potential difference $e_{39}-e_{41}$ should result in a reduction of $v_{78}$ in order to obtain the correct effect with the device.

In case C it is seen that when $v_{78}$ is greater than $v_{77}$, the potential difference $e_{38}-e_{40}$ is negative. In this case however the commutator 52 has rotated half a revolution from the point of adjustment in case A. On this account the potential difference $e_{38}-e_{40}$ is applied to the amplifier 73 with an opposite sign to that in case A. Thus the amplifier also receives a positive potential difference in case C when $v_{78}$ is greater than $v_{77}$, and in this case too the motor 80 will turn the shaft 78 in such a way that $v_{78}$ approaches the value of $v_{77}$. A reasoning on analogous lines for case D shows that the same effect is obtained here too.

Within each of the four ranges the angular adjustment of the controlled shaft 78, and therefore of the controlled object 82, will be equally accurate in relation to the angular adjustment of the controlling shaft 77 as in the case of the device in Fig. 5, within its range of angular adjustment. With the device shown in Fig. 10 it may happen that the angular difference $v_{77}-v_{78}$ is quite considerable. When it exceeds certain limits the controlled device tends to set in a position of equilibrium in some other manner than that described above. I shall show, with reference to Fig. 12, how this may occur. This figure shows the same curves for the voltages induced in the coils 38, 39, 40 and 41, as in Fig. 11. The assumed positions for $v_{77}$ and $v_{78}$ are marked in the figure. The position $a$ indicated in the figure has been so selected that if $v_{78}$ were to occupy the position $a$, the potential difference $e_{38}-e_{40}$ would be zero. When $v_{78}$ now lies to the right of position $a$ the potential difference will be negative and the motor 80, as we have seen above, will turn the shaft 78 so that $v_{78}$ increases, that is to say, it will be moved to the right in Fig. 12. The shaft 78 is then turned forward to the position $v_{77}+2\pi$, in which position the potential difference will be zero and the motor 80 will stop. If the controlled object 82 consists of a gun turret for example, which is rotated one revolution when the shaft 78 rotates one revolution, the latter will thereby take up the same position as if the shaft 78 had been moved to the position $v_{77}$. The latter would have occurred if $v_{78}$ had been located somewhat to the left of the position $a$ before the beginning of the positioning movement, so that the potential difference $e_{38}-e_{40}$ would have been positive. Since the controlled object 82 is so geared to the shaft 78 that the positions $v_{77}$ and $v_{77}+2\pi$ correspond to one another, the object will always follow correctly, whatever initial position it may occupy.

In Fig. 13 the voltage conditions are shown for the adjustment movement when $v_{77}$ lies in the angular adjustment range C. In view of the fact that in this case the commutator 52 supplies the amplifier 73 with a potential difference $e_{38}-e_{40}$ of opposite sign to that in case A, the curves in Fig. 13 are plotted with an opposite sign for the ordinates to that for the case in Fig. 12. An examination of Fig. 13 will show that the conditions are entirely analogous to the conditions in Fig. 12, that is to say, $v_{78}$ will be moved to the position $v_{77}+2\pi$ if the potential difference is negative from the outset, and to the position $v_{77}$ if it is positive.

Analogous conditions also exist in the angular adjustment ranges B and D.

It will at once be perceived that if $v_{78}$ is in a position sufficiently to the left of $v_{77}$ from the outset in any of the cases described above, the adjustment movement could have been terminated in the position $v_{77}-2\pi$ for example. Generally speaking, the adjusting movement may be terminated in a position $v_{77}+n.2\pi$ where $n$ is a positive or negative integer. Since all these positions correspond to one another with respect to the adjustment of the controlled object 82, the latter will always be moved to its correct predetermined position by the shaft 77. The accuracy of adjustment for the shaft 78 is approximately 0.001 radian, and with a gear ratio of 1:1 between this shaft and the controlled object 82 the accuracy of adjustment will be similar for the latter. Such accuracy of adjustment is entirely adequate for a very large number of cases in which remote control is adopted.

If the device in Fig. 10 is to be employed for the control of an object with a limited range of adjustment the gear ratio between the object 82 and the shaft 78 must be such that the adjustment range corresponds to a rotation of the shaft 78 of 180°. This can be seen from Fig. 14. In this figure the same curves for the voltages induced in the coils 38, 39, 40 and 41 are given as in Fig. 12. Below these curves a number of different cases are shown for the position of $v_{77}$, and in each case the manner in which $v_{78}$ will move during the positioning movement is indicated by arrows, The length of each arrow corresponds to the range within which $v_{78}$ will be displaced in the direction of the arrow during the movement. The range within which $v_{77}$ and $v_{78}$ may arbitrarily be placed without causing $v_{78}$ to move away from $v_{77}$ is limited by the lines E and F. As will be seen from the figure, the angular distance between these lines is 180° and the angular range located between the lines may be employed for single-valued angular adjustment. If the degree of accuracy in the adjustment of the controlled object thus obtained is insufficient, the device shown in Fig. 10 must be supplemented by some form of so-called coarse system.

Fig. 15 shows an arrangement of this kind comprising a fine system and a coarse system, this arrangement permitting extremely accurate adjustment of the controlled object in relation to the extent of the range of adjustment. In the figure 83 is a transmission device similar to that shown in Fig. 10 and consisting of the double synchros 35 and 34, whilst 84 is a transmission device similar to that shown in Fig. 5 and consisting of the single synchro 100 and 99. In the transmission device 83 the adjusting shaft 85 is coupled to the controlling device and the shaft 86 is connected to the controlled object 96. The potential difference produced by the transmission device 83 when the shafts 85 and 86 are each in different positions is applied to the amplifier 91 through the input terminals 92 or 93. The amplifier influences the starter 97 for the motor 98 which drives the controlled object 96 in the direction indicated previously. Here again the details of the amplifier 91, motor 98 and starter 97 have been omitted since the arrangement can be as described in the previously mentioned Bernarde patent.

It has been shown above that the transmission device 83 can only direct the object 96 to the correct position, calculated in whole revolutions and fractions of revolutions of the shaft 86, if the shafts 85 and 86 can be made not to deviate from one another up to 180°. In the device shown in Fig. 15 the arrangement is such that the controlling action of the transmission device 83 ceases when the angular difference between the adjustment of the shafts 85 and 86 is increased toward the value 180°. This is effected by means of the transmission device 84. The controlling shaft 87 is coupled through the gear 89 to the controlling shaft 85 and the controlled shaft 88 is coupled through the gear 90 to the controlled shaft 86. The gears 89 and 90 have the same ratio and the directions of movement are so selected that when the shafts 85 are rotated in accordance with one another, this also takes place with regard to the shafts 87 and 88. The potential difference obtained from the transmission device 84 is applied to the amplifier 91 through the input terminals 94. In consequence of the interconnection of the shafts 85, 87 and 86, 88 respectively, referred to above, the conditions will apply that when the shaft 86 is located in its correct position, all potential differences applied to the amplifier 91 will be zero. The gearing between the shafts 85 and 87 is so selected that the shaft 87 is turned approximately two milli-radians when the shaft 85 is turned a half-revolution. The same thing applies to the shafts 86 and 88.

If the shaft 86 is now turned from its correct position, the potential difference obtained from the transmission system 83 will assume an appreciable value, whilst the potential difference from the system 84 will gradually increase with the incorrect angle at the shaft 86. Before this angle reaches a half-revolution, however, the latter voltage will be great enough to influence a connecting device in the amplifier 91 in such a way that the potential difference from the system 83 is cut out and prevented from influencing the starter 97. The connecting device may be constructed in some manner known per se with electron tubes or relays. With incorrect angles at the shaft 86 exceeding half-a-revolution the starter 97 is only influenced by the potential difference from the system 84.

If for any reason the shaft 86 has now taken up an incorrect position exceeding half-a-revolution, the motor 98 is driven by the system 84 in the direction towards a position in which the angle of rotation of the shaft 88 deviates by less than a milli-radian from the value corresponding to the position of the shaft 87, which implies that the angle of rotation for the shaft 86 differs by approximately 90° from the angle of rotation for the shaft 85. Before the shafts 86 and 88 reach this position, however, the system 83, which is far more sensitive within this angular range, is connected up by means of the change-over switch in the amplifier 91 influenced by the voltage from the system 84, so that the motor 98 is driven by the potential difference from the system 83 to a position in which the difference between the angles of rotation for the shafts 85 and 86 is less than one milli-radian.

The gearing between the shafts 86 and 88 referred to above, enables the shaft 86 to make $1570^2$ revolutions when the shaft 88 is turned $90°=1570$ milli-radians, which constitutes the range of adjustment. The shaft 86 is adjusted for approximately $\frac{1}{6280}$ revolution, and the arrangement shown in Fig. 15 will thus have a range of adjustment comprising about $1570^2 \times 6280 \approx 15.5 \times 10^9$ accurate steps.

The invention is in no way limited to the embodiments described above with reference to the drawings but may also be carried out in other forms. Thus it is possible to construct the different synchros in such a way that their outer parts are arranged to rotate around the fixed inner parts. The double synchro shown in Fig. 9 may be so modified that the two rotor windings 32 and 33 each co-operate with its separate stator winding. In this case the stator windings may be so arranged that the directions of the alternating field produced by them are not parallel but form a certain angle with one another. In this case the angle between the planes of the two rotor windings should not be 90° but about 90° increased by the last-mentioned angle between the alternating fields. Furthermore, the double synchro according to Fig. 9 may be replaced by an element formed by the combination of more than two single synchros. In this case the angles between the planes of the different rotor windings may be approximately equal to 180° divided by the number of separate synchros included, which angles should of course be increased by the angles that may be formed between the alternating fields of the different synchros. In this case also the different rotor windings of the synchro connected to the controlling shaft should be series-connected in pairs to corresponding rotor windings of the synchro connected to the controlled shaft. In this case too the commutators 52 and 61 should have their counterpart in commutators or other connecting devices which interrupt the connection between a pair of series-connected rotor windings such as referred to above, and the regulating device 73 or 91 indicated in Fig. 10 or 15, within such angular ranges for the one rotor winding which deviate by more than approximately ±180° divided by the total number of synchros connected in pairs, from the angular positions for the last-mentioned rotor winding, for which the voltage induced in the rotor winding is equal to zero.

It should be noted that when suitable potential dividers or transformers are employed, the different synchros need not be of the same size. Thus for example, in the device according to Fig. 5 the synchro may be so dimensioned that with an equal angular adjustment the voltage induced in the rotor winding 14 of the synchro 9 is twice as great as the voltage induced in the rotor winding 15 of the synchro 10 if the two rotor windings are connected to one another through a transformer with a transformation ratio of 2:1.

What I claim is:

1. A follow-up system for transmitting angular motion of a controlling shaft coupled to the rotatable element of a transmitter synchro to a controlled shaft coupled to the rotatable element of a repeater synchro of like type, each said synchro including outer and inner elements one of which is stationary and the other rotatable, said outer element being comprised of a core of magnetic material having a pair of confronting pole faces and a winding thereon adapted to be connected to a source of alternating current and said inner element comprised of a body of non-magnetic material disposed between said pole faces having a plurality of windings thereon the winding planes of which form angles with one another equal to 180° divided by the number of windings, circuit means pairing correspondingly positioned windings on the inner elements of said synchros in series opposition, a reversible motor coupled to said controlled shaft and the rotatable element of the associated synchro, control means for said motor energized in response to the difference between the voltages induced in the windings of each pair for driving said motor in such direction as to decrease the voltage difference between the paired windings to zero, and switching means individual to each of said pairs of windings and controlled in accordance with the position of the rotatable element of said transmitter synchro for selectively connecting said difference voltages to energize said motor control means.

2. A system for transmitting angular motion as defined in claim 1 for the remote control of an object with a limited range of adjustment wherein the object is coupled to the rotatable element of said repeater synchro through gearing of a ratio such that the rotatable element of said repeater will not exceed 180° rotation for the entire range of adjustment of the object.

3. A follow-up system for transmitting angular motion of a controlling shaft coupled to the rotatable element of a transmitter synchro to a controlled shaft coupled to the rotatable element of a repeater synchro of like type, each said synchro including outer and inner elements one of which is stationary and the other rotatable, said outer element being comprised of a core of magnetic material having a pair of confronting pole faces arranged in spaced parallel relation and a winding on said core adapted to be connected to a source of alternating current, and said inner element being comprised of a body of non-magnetic material disposed between said pole faces and having a plurality of windings thereon the winding planes of which form angles with one another equal to 180° divided by the number of windings, said pole faces extending in a direction normal to the axis of relative rotation of said elements for a substantial distance beyond the limits of the windings on said inner element, circuit means pairing correspondingly positioned windings on said inner elements of said synchros in series opposition, a reversible motor coupled to said controlled shaft and the rotatable element of the associated synchro, control means for said motor energized in response to the difference between the voltages induced in the windings of each pair for driving said motor in such direction as to decrease the voltage difference between the paired windings of each pair for driving said motor in such direction as to decrease the voltage difference between the paired windings to zero, and switching means individual to each of said pairs of windings and controlled in accordance with the position of the rotatable element of said transmitter synchro for selectively connecting said difference voltages to energize said motor means.

KARL BERTIL PALME.

REFERENCES CITED

The following references are of record in the file of this patent:

UNITED STATES PATENTS

| Number | Name | Date |
|---|---|---|
| 1,268,712 | Harle | June 4, 1918 |
| 1,973,279 | Bernarde | Sept. 11, 1934 |
| 1,985,982 | Edwards | Jan. 1, 1935 |
| 2,288,628 | Lee | July 7, 1942 |
| 2,336,994 | MacKay | Dec. 14, 1943 |
| 2,414,384 | Moseley | Jan. 14, 1947 |
| 2,417,015 | Razek | Mar. 4, 1947 |
| 2,465,624 | Agins | Mar. 29, 1949 |